(12) United States Patent
Fallis

(10) Patent No.: US 6,991,730 B1
(45) Date of Patent: Jan. 31, 2006

(54) METHODS FOR REMOVING ORGANOLEAD COMPOUNDS FROM AQUEOUS COMPOSITIONS

(75) Inventor: Kathleen A. Fallis, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 49 days.

(21) Appl. No.: 10/701,413

(22) Filed: Oct. 30, 2003

(51) Int. Cl.
*C02F 1/78* (2006.01)

(52) U.S. Cl. .................. 210/665; 210/688; 210/694; 210/721; 210/760; 210/912

(58) Field of Classification Search ............... 210/665, 210/668, 651, 688, 694, 721, 760, 912
See application file for complete search history.

(56) References Cited

U.S. PATENT DOCUMENTS

| | | | |
|---|---|---|---|
| 3,308,061 A | * | 3/1967 | Collier, Jr. .................. 210/721 |
| 3,770,423 A | * | 11/1973 | Lores et al. .................. 75/722 |
| 4,048,061 A | | 9/1977 | Blytas |
| 4,070,282 A | | 1/1978 | Otto |
| 5,082,568 A | * | 1/1992 | Holler .................. 210/679 |
| 5,128,029 A | * | 7/1992 | Herrmann .................. 210/107 |

* cited by examiner

*Primary Examiner*—Peter A. Hruskoci
(74) *Attorney, Agent, or Firm*—Charlene A. Haley

(57) ABSTRACT

Methods for removing organolead compounds from aqueous and non-aqueous organolead compositions. The methods of the present invention include: providing aqueous or non-aqueous compositions including organolead compounds; ozonating the organolead compositions with ozone, wherein the organolead compounds are oxidized producing insoluble lead oxide polymers; contacting the aqueous or non-aqueous compositions including insoluble lead oxide polymers through activated carbon to remove the insoluble lead oxide polymers; filtering the aqueous or non-aqueous compositions including lead oxide polymers through at least one filtering means to remove the insoluble lead oxide polymers; and recovering the aqueous or non-aqueous compositions substantially free of organolead compounds and/or other unwanted contaminants or impurities.

10 Claims, 4 Drawing Sheets

METHODS FOR REMOVING ORGANOLEAD COMPOUNDS FROM AQUEOUS COMPOSITIONS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates to methods for removing lead from aqueous and non-aqueous compositions, and more specifically, methods for converting organolead compounds into insoluble lead oxide polymers for removal through filtration and activated carbon to produce lead-free or substantially lead-free compositions.

BACKGROUND OF THE INVENTION

The production of lead-free or substantially lead-free fuels is, of course, well within the ordinary skill in the art. It is also well known that the public and government have been interested in eliminating or at least significantly reducing the amount of pollutants emitted to the atmosphere as the result of combustion of various fuels in internal combustion engines. Lead and its compounds, especially alkyl lead, $R_4Pb$, are not recognized as naturally occurring in crude oil. However, lead is found in crude oils and their distillate fractions and is usually traced to the lead contamination in gasoline.

Although non-leaded gasolines may be produced at the refinery with significant low lead levels to meet the legal requirements, occasionally fuels will absorb small but significant amounts of lead compounds from storage, or transport of fuels in lead contaminated tanks and pipelines, which may exceed the legal limit. A number of processes have been designed to remove heavy metals from crude oil, fuel, and water with varying degrees of success.

U.S. Pat. No. 4,048,061 issued on Sep. 13, 1977 to George C. Blytas teaches a process for reducing the level of compounds of certain metals from hydrocarbon liquids by contacting metal compound-bearing hydrocarbons with acidified active carbon. One major problem with this patent is that the amounts of reactants utilized will vary depending upon the particular active carbon as well as the oxidizing/acidic fluid employed. It was also found that the acidified active carbon will only partially be removed from the fuels and that some commercially employed additives are used and remain in the fuel.

U.S. Pat. No. 4,070,282 issued on Jan. 24, 1978 to Jack M. Otto teaches a method of removing ionizable organolead compounds from aqueous liquid compositions. However, this patent does not teach the use of ozone to oxidize organolead compounds to form insoluble lead oxide polymers for easier removal of the polymer and thus the lead.

The need for the removal of metals is evidenced by the fact that their presence in hydrocarbon charge stocks conducted to catalytic cracking and catalytic reforming process units is known to poison and shorten the life of the catalyst with which such metal contaminated stocks come into contact. It is also desirable to remove trace metals from lubricating oils or to recover soluble metal catalysts from reactor effluents or polymer solutions.

From the foregoing, it will be appreciated that there is a need in the art for a method of removing lead from both aqueous and non-aqueous compositions, which are environmentally safe. The present invention is directed to overcoming one, or more, of the problem set forth above.

SUMMARY OF THE INVENTION

One embodiment of the present invention relates to methods for removing organolead compounds from aqueous organolead compositions. The methods of the present invention include: providing aqueous compositions including organolead compounds; ozonating the organolead composition with ozone, wherein the organolead compounds are oxidized producing insoluble lead oxide polymers; contacting the aqueous compositions including insoluble lead oxide polymers through activated carbon to remove the insoluble lead oxide polymers; filtering the aqueous compositions including lead oxide polymers through at least one filtering means to remove the insoluble lead oxide polymers; and recovering the aqueous compositions substantially free of organolead.

Another embodiment of the present invention relates to methods for removing organolead compounds from non-aqueous compositions including organolead fuel compositions. The methods of the present invention include: providing fuel compositions including organolead compounds; ozonating the organolead fuel compositions with ozone, wherein the organolead compounds are oxidized producing insoluble lead oxide polymers; contacting the organolead fuel compositions including insoluble lead oxide polymers through activated carbon to remove the insoluble lead oxide polymers; filtering the fuel compositions including lead oxide polymers through at least one filtering means to remove the insoluble lead oxide polymers; and recovering the fuel compositions substantially free of organolead.

The present invention provides methods for the removal of organolead compounds from aqueous and non-aqueous compositions to reduce breathable lead into the atmosphere and to reduce dissolved organolead compounds resulting from the overflow from clarifier ponds and settling lagoons.

It is to be understood that the foregoing general description and the following detailed description are exemplary and explanatory only and are not to be viewed as being restrictive of the present invention, as claimed. These and other objects, features and advantages of the present invention will become apparent after a review of the following detailed description of the disclosed embodiments and the appended claims.

DETAILED DESCRIPTION OF SPECIFIC EMBODIMENTS

Figure 1:
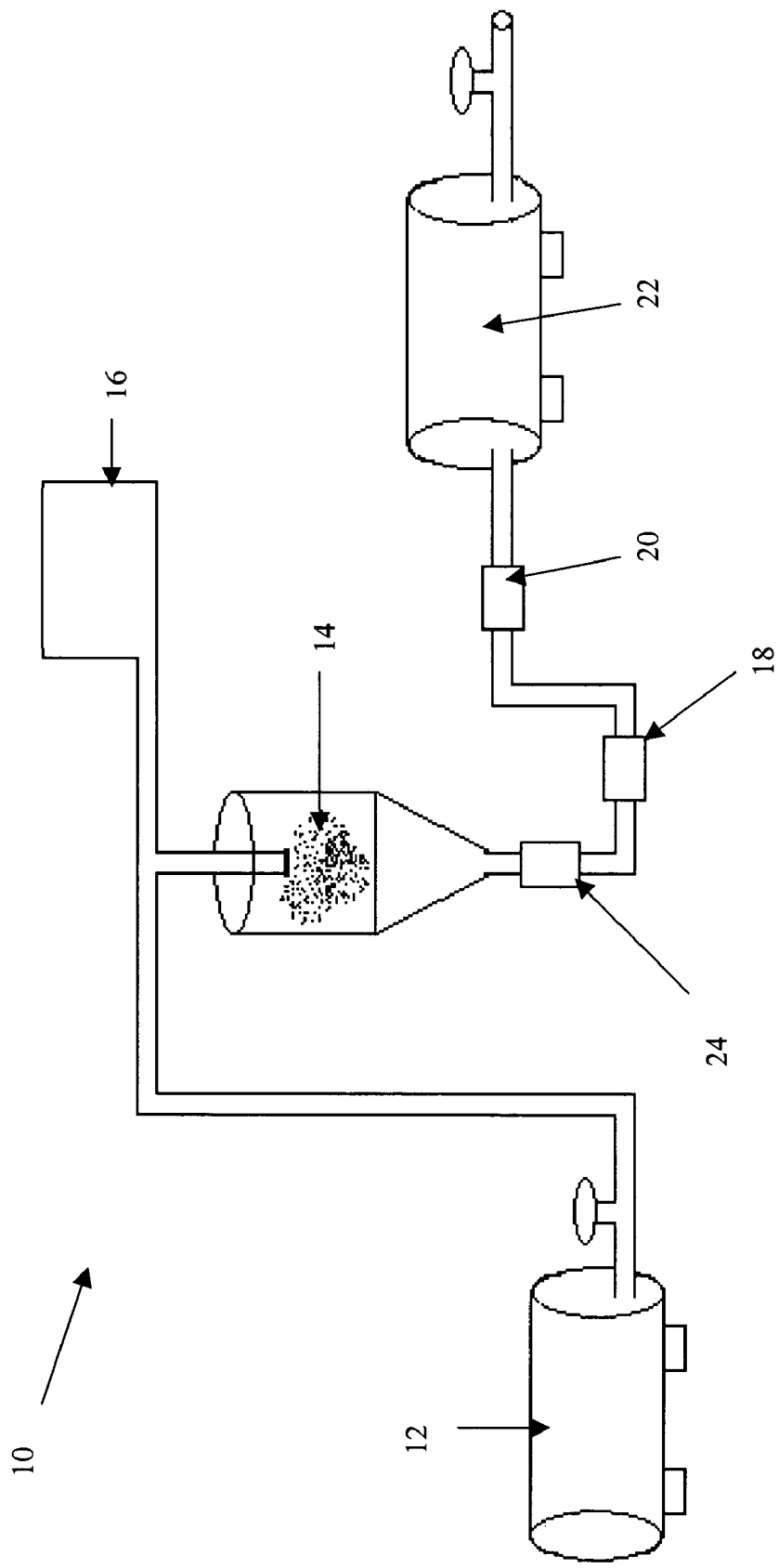
FIG. 1 illustrates a flow chart of one exemplification of the method for removing lead from an aqueous or non-aqueous composition including at least one ozone generating means, filter(s), and activated carbon according to the present invention.

The present invention relates to methods for removing lead from aqueous and non-aqueous compositions to produce lead-free or substantially lead-free compositions. FIG. 1 illustrates a flow chart of one exemplification of the methods for removing lead from an aqueous or non-aqueous composition including at least ozone generating means, filters, and activated carbon.

Embodiments of the present invention 10 relate to methods for removing organolead compounds from aqueous organolead compositions, including: providing aqueous compositions including organolead compounds 12; ozonating 14 the organolead composition with ozone, wherein the organolead compounds are oxidized producing insoluble lead oxide polymers; contacting 18 the aqueous compositions including insoluble lead oxide polymers through activated carbon to remove the insoluble lead oxide polymers; filtering 20 the aqueous composition including lead oxide polymers through at least one filtering means to remove the insoluble lead oxide polymers; and recovering 22 the aqueous compositions substantially free of organolead.

The aqueous organolead compositions are exposed to at least 0.001 moles of ozone during the ozonating process. The process of ozonating the aqueous organolead compositions with ozone is performed for at least about 25 seconds to show significant reduction in organolead compounds. However, ozonating the aqueous compositions for longer periods of time promote further reduction of organolead compounds. The ozone utilized in embodiments of the methods of the present invention are produced by chemical or electrical generation 16, however, other methods for generating ozone that are known in the art will also suffice. In embodiments of the present invention an ozone generator 16 produced the desired amount of ozone.

The organolead compounds in the aqueous compositions in embodiments of the present invention include, but are not limited to, tetra alkyl lead, tetra ethyl lead, tetra methyl lead, ethyltrimethyl lead, diethyldimethyl lead, and any ethyl or methyl lead compounds thereof. Other organolead compounds include organohalogenated lead compounds having at least one of alkyl lead chlorides including ethyl lead trichloride, diethyl lead chloride, triethyl lead chloride, methyl lead trichloride, dimethyl lead chloride, trimethyl lead chloride, and mixture of transalkylation products thereof. Alkyl lead cations are soluble in aqueous compositions and their solubility is relatively insensitive to pH. Alkyl lead cations cannot be removed by filtration or by settling, regardless of pH. Whenever triethyl lead chloride is referred to herein, it will be understood to include the other dispersed compounds and water soluble organolead compounds normally present therewith.

When contacting 18 the aqueous compositions through activated carbon, substantially other unwanted contaminants and/or impurities are also removed in addition to organoleads. Depending on the aqueous composition, one skilled in the art would be able to determine which contaminants and/or impurities are unwanted. Filtering 20 the aqueous compositions including lead oxide polymers through at least one filtering means to remove the insoluble lead oxide polymers is achieved by at least one filtering means. The filtering means 20 include filters, frits, and other separating apparatuses known in the art, which range in porosity from about 0.45 $\mu$m to about 50 $\mu$m.

In the experiments below it is reasonable to one skilled in the art that the longer aqueous organolead compositions are exposed to ozone, an increase in the amount of organolead compounds will be removed. Embodiments of the present methods having organolead compounds in aqueous compositions have shown to be reduced from up to about 99.9%.

Another embodiments of the present invention 10 relates to methods for removing organolead compounds from non-aqueous compositions including organolead fuel compositions. The methods of the present invention include: providing 12 fuel compositions including organolead compounds; ozonating 14 the organolead fuel compositions with ozone, wherein the organolead compounds are oxidized producing insoluble lead oxide polymers; contacting 18 the organolead fuel compositions including insoluble lead oxide polymers through activated carbon to remove the insoluble lead oxide polymers; filtering 20 the fuel compositions including lead oxide polymers through at least one filtering means to remove the insoluble lead oxide polymers; and recovering the fuel compositions substantially free of organolead.

The desired organolead compounds in the non-aqueous compositions in embodiments of the present invention include, but are not limited to, tetra alkyl lead, tetra ethyl lead, tetra methyl lead, ethyltrimethyl lead, diethyldimethyl lead, and any ethyl or methyl lead compounds thereof. Other organolead compounds include organohalogenated lead compounds having at least one of alkyl lead chlorides including ethyl lead trichloride, diethyl lead chloride, triethyl lead chloride, methyl lead trichloride, dimethyl lead chloride, trimethyl lead chloride, and mixture of transalkylation products thereof.

The non-aqueous organolead compositions are exposed to at least about 0.001 moles of ozone during the ozonating process. The process of ozonating 14 the non-aqueous organolead compositions with ozone are performed for at least about 25 seconds to show significant reduction in organolead compounds. However, ozonating both aqueous and non-aqueous compositions of the present invention for longer than the 5 minutes promotes further reduction of organolead compounds. The amount of time of ozonating both aqueous and non-aqueous compositions including organolead compounds depend on volume, amount of organolead present in the compositions, temperature, pH, flow rates, and inclusion of other contaminates or impurities in the compositions.

When contacting 18 the non-aqueous compositions through activated carbon, substantially other unwanted contaminants and/or impurities are also removed in addition to organoleads. Depending on the non-aqueous composition, one skilled in the art would be able to determine which contaminants and/or impurities are unwanted. Exposure to activated carbon utilized in the present invention depends on many variables including whether the compositions are aqueous or non-aqueous, inclusion of other contaminants and/or impurities, temperature, flow and absorption rates, mesh size, and pH. Filtering 20 the non-aqueous compositions including lead oxide polymers through at least one filtering means to remove the insoluble lead oxide polymers is achieved by at least one filtering means. The filtering means 20 include filters, frits, and other separating apparatuses known in the art, which range in porosity from about 0.45 $\mu$m to about 0.5 $\mu$m. The porosity of each filter depends on the amount of lead oxide precipitate that is collected, as a result, embodiments of the present invention include porosity of the filtering means ranging from about 1 m to about 50 μm. In other embodiments of the present invention, a bag filter is included as another filtering means 24 is utilized when treating samples to remove other contaminants, leaves, dirt, and other solids that may be in the influent.

In the experiments below it was shown that the longer the non-aqueous organolead compositions are exposed to ozone, an increase in the amount of organolead compounds are removed. Embodiments of the present methods having organolead compounds in non-aqueous compositions are shown in the experiments below to be reduced up to about 99.9%.

It is important to note that when the organolead compounds are in contact with halogenated compounds, including soil materials, or where biogeochemical processes have taken place, there is the possibility that halogen exchange reactions have taken place and possible combinations of organohalogenated lead species are formed. The process of ozonolysis is defined as the process of treating an organic compound with ozone to form an ozonide, which is typically used to locate double bonds in molecules. The process of filtering the organolead compositions through filters will include being either passed upwardly or downwardly through the filter.

The present invention will now be explained with references to the following non-limiting examples.

EXAMPLES 1–3

A series of samples for three experiments were prepared, treated, and analyzed using the process of ozonolysis. A Polymetrics Laboratory Ozonator (Model T-816) produced the ozone used, which converts $O_2$ to $O_3$. The settings on the ozonator were 90V, 7 psi $O_2$, and an output of 0.9 liter per minute. At these settings, $3.65 \times 10^{-3}$ moles/L or $5.48 \times 10^{-5}$ moles/sec of $O_3$ were generated. Table 1 lists the calculated amount of ozone generated at the above conditions for various lengths of time for all three experiments.

TABLE 1

Amount of ozone generated.

| Time (sec) | Ozone generated (moles) |
| --- | --- |
| 30 | 0.001644 |
| 60 | 0.003288 |
| 90 | 0.004932 |
| 120 | 0.006576 |
| 180 | 0.009864 |
| 240 | 0.013152 |
| 300 | 0.016440 |

Activated carbon is typically a carbonaceous adsorbent with a high internal porosity, and hence a large internal surface area. Commercially available activated carbon grades typically have an internal surface area of about 500 $m^2/g$ up to about 1500 $m^2/g$. Related to the type of application, two major groups exist: powdered activated carbon having a particle size of about 1–150 microns, and granular activated carbon (granulated or extruded) having a particle size in the 0.5–4 mm range. Although any activated carbon with the above porosity/particle sizes are usable in the present invention, the experiments below utilized powered activated carbon with a mesh size of about 100 μm.

Figure 2:
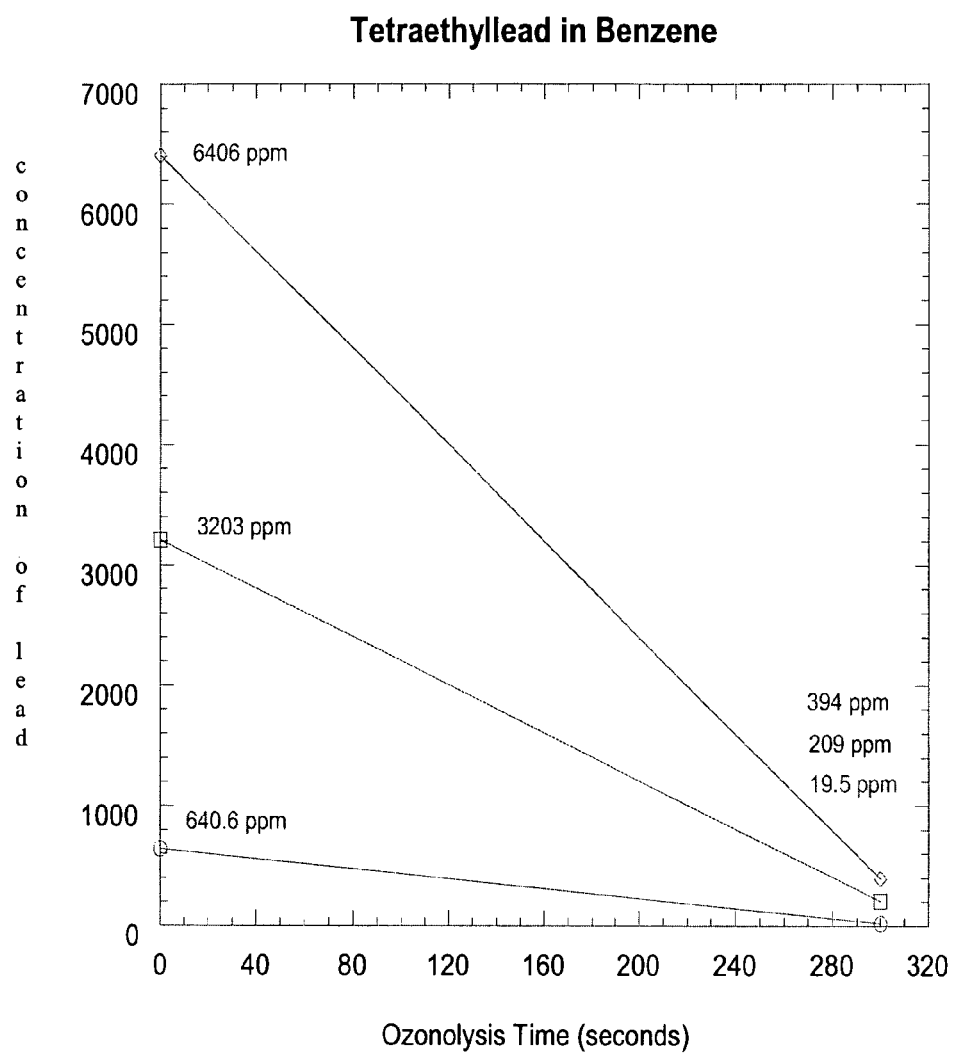
FIG. 2 illustrates a graph charting the amount of lead removal as a function of initial concentration of lead and amount of time subjected to the process of ozonolysis based on data obtained from the first experiment according to the present invention.

In the first experiment, three samples of benzene including 1,000, 5,000, and 10,000-ppm tetra ethyl lead (TEL) were prepared (the appropriate amount of TEL was added to benzene to make a solution with the desired concentration) and treated (ozonation/filtration process). A 20-ml aliquot of each sample was placed in a 40-ml vial and ozonated for 5 minutes. A 1-gram portion of activated carbon was placed in each vial and mixed well for approximately 30 seconds. Each sample was filtered through filter(s) having a porosity of about 0.45μ. A 1-ml portion of the filtered solutions was acid digested (heating with concentrated acid, to ensure that all metal-containing species are in solution) in preparation for analysis by inductively coupled plasma atomic emission spectroscopy (ICP-AES). The digestion followed EPA Method 3050B except that a final volume of 50 ml was attained after digesting. Also, the samples were filtered again through other 0.45μ filters this filtration is used for ICP-AES, the technique uses a nebulizer, which requires the strict absence of any solid materials before an analysis is performed to determine the amount of organolead which has been removed. The results of the amount of organolead concentrations before and after treatment are presented in Table 2 and FIG. 2. FIG. 2 shows that about 93–97% of the lead concentration was removed by the methods of the present invention.

TABLE 2

Reduction of the amount of organolead in the benzene compositions.

| Sample | Lead Concentration before treatment | Lead Concentration after treatment |
| --- | --- | --- |
| 1,000 ppm TEL | 640.6 ppm | 19.5 ppm |
| 5,000 ppm TEL | 3203 ppm | 209 ppm |
| 10,000 ppm TEL | 6406 ppm | 394 ppm |

The reductions in organolead compounds in these experimental results are on the order from about 620 ppm, by weight, to over 6000 ppm, by weight, by flow rates, particle geometry, temperatures, and pH herein contemplated. The results showed that significantly high levels of organolead compounds were removed from a non-aqueous solvent in a short amount of time (5 min or 300 sec). This experiment showed that the longer a sample is ozonated, the more efficient the removal of lead.

In the second experiment, samples of Chevron® AVGAS 100 Low Lead was obtained from a local airport with an initial amount of about 2 g TEL/gallon. Samples 1 through 8 were prepared and treated by placing 20-ml aliquots in 40-ml vials and ozonating each sample for 0, 30, 60, 90, 120, 180, 240, and 300 seconds. A 1-gram portion of powdered activated carbon was placed in each vial including one of the eight samples and was well mixed for about 30 seconds.

To determine the effect of the activated carbon on lead removal, two additional samples were added. Sample 9 was not treated with ozone and not mixed with activated carbon and then filtered. Sample 10 was treated with ozone for 300 seconds, but not exposed to activated carbon before filtering. Sample 11 of unleaded jet fuel was also obtained, ozonated for 300 seconds, and mixed with activated carbon for about 30 seconds. All 11 samples were filtered through 0.45μ filters to remove the insoluble lead oxide polymers formed during the above process. A 1-ml portion of the filtered solutions was acid digested in preparation for analysis by inductively coupled plasma atomic emission spectroscopy (ICP-AES). The digestion followed EPA Method 3050B except that a final volume of 50 ml was used after digesting.

Figure 3:
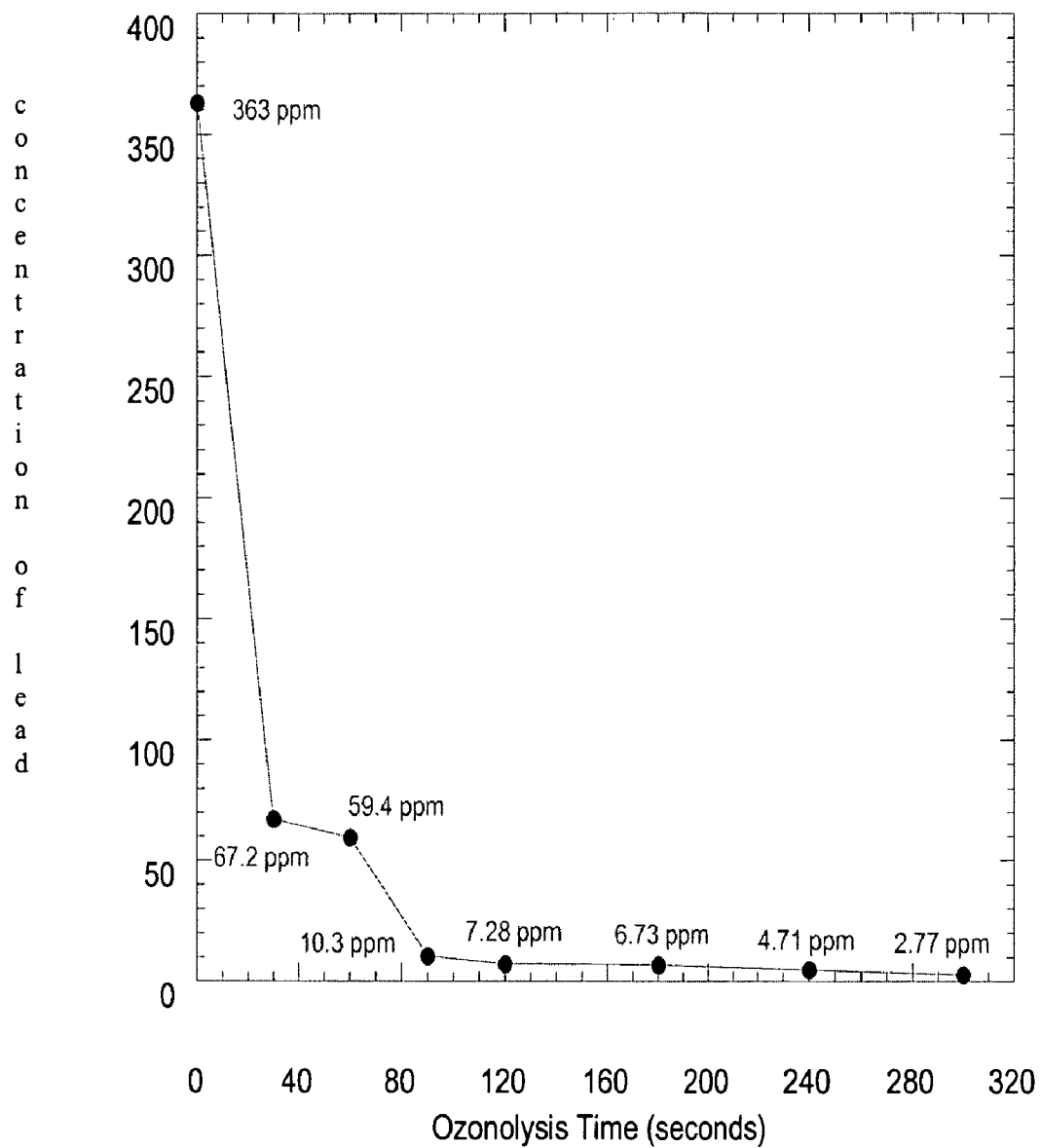
FIG. 3 illustrates a graph charting the amount of lead removal as a function of initial concentration of lead and amount of time subjected to the process of ozonolysis based on data obtained from the second experiment according to the present invention.

All samples were filtered again through 0.45μ filters before analysis. The results of the 11 samples are presented in Table 3 and FIG. 3. FIG. 3 showed that the longer the samples were exposed to ozone, the greater the amount of lead was removed.

TABLE 3

Eleven samples including TEL before treatment and the amount of Tel removed after treatment.

| Experiment sample # | AVGAS Sample | Lead Concentration before Treatment | Lead Concentration after Treatment |
|---|---|---|---|
| 9 | 0 seconds, no activated carbon filtered | 363 ppm | 363 ppm |
| 1 | 0 seconds, activated carbon, filtered | 363 ppm | 359 ppm |
| 2 | 30 seconds, activated carbon, filtered | 363 ppm | 67.2 ppm |
| 3 | 60 seconds, activated carbon, filtered | 363 ppm | 59.4 ppm |
| 4 | 90 seconds, activated carbon, filtered | 363 ppm | 10.3 ppm |
| 5 | 120 seconds, activated carbon, filtered | 363 ppm | 7.28 ppm |
| 6 | 180 seconds, activated carbon, filtered | 363 ppm | 6.73 ppm |
| 7 | 240 seconds, activated carbon, filtered | 363 ppm | 4.71 ppm |
| 8 | 300 seconds, activated carbon, filtered | 363 ppm | 2.77 ppm |
| 10 | 300 seconds, no activated carbon, filtered | 363 ppm | 2.78 ppm |
| 11 | Jet fuel, 300 seconds, activated carbon, filtered | 363 ppm | not detected (<2.5 ppm) |

The reductions in organolead compounds in these experimental results are on the order from about 363 ppm, by weight, to about <2.5 ppm (just above the detection limit for the analysis), by weight, amount of exposure to ozone, by flow rates, particle geometry, temperatures, and pH herein contemplated. The results show that the process works on an actual leaded aviation fuel and that the efficiency of the removal is again dependent upon the length of time the sample is ozonated. The results also show that essentially the activated carbon had little or no effect in removing lead without ozonolysis or when added after ozonolysis.

In the third experiment, a sample of fuel was obtained from wells at the North Island, Coronado Naval Base, California, having a lead concentration of about 490 ppm. The first 3 samples was treated (ozonated, AC, filtration) and analyzed. These first 3 samples were ozonated for 1, 3, and 5 minutes. A fourth sample was spiked with 3,203 ppm lead (5,000 ppm TEL) and treated for 5 minutes. A 1-gram portion of activated carbon was placed in each vial including one of the four above samples and was well mixed for about 30 seconds.

Figure 4:
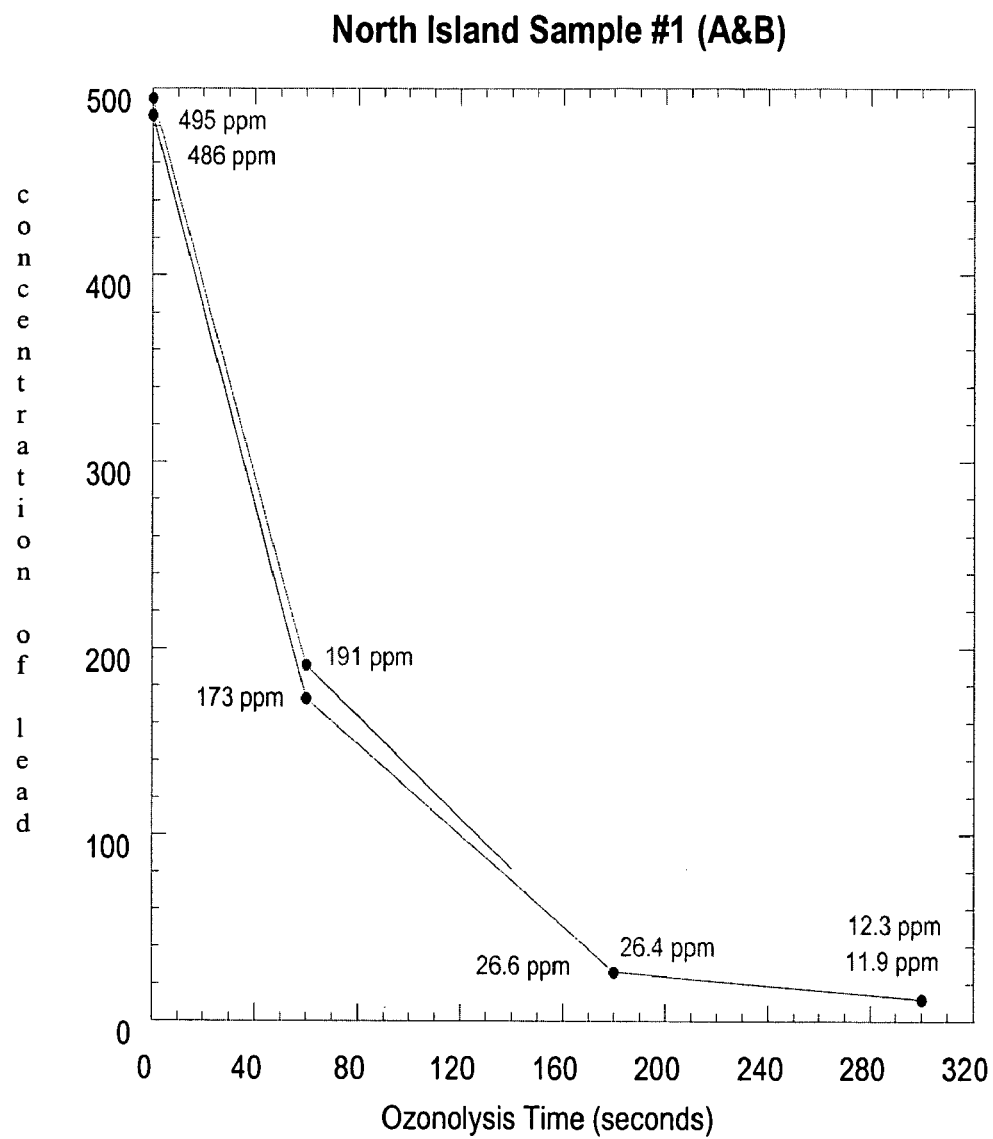
FIG. 4 illustrates a graph charting the amount of lead removal as a function of initial concentration of lead and amount of time subjected to the process of ozonolysis based on data obtained from the third experiment according to the present invention.

To determine the effect of activated carbon and filtering on lead removal, three more samples # 5, 6, and 7 were added to the experiment. Samples 5 and 6 were not treated with ozone. Sample 6 was mixed with activated carbon and filtered through 0.45μ filters. Sample 5 was only filtered through 0.45μ filters. Sample 7 was treated for 5 minutes and not exposed to activated carbon before filtering. All seven samples mentioned were run in duplicate (referred to as "A&B" in Table 4) to determine the reproducibility of the lead removal process. All the samples were filtered again through 0.45μ filters. A 1-ml portion of the filtered solutions was acid digested in preparation for analysis by inductively coupled plasma atomic emission spectroscopy (ICP-AES). The digestion followed EPA Method 3050B except that a final volume of 50 ml was attained after digesting. All samples were filtered again through 0.45μ filters before analysis. The results of the seven samples are presented in Table 4 and FIG. 4. FIG. 4 showed that the longer the samples were exposed to ozone, the greater the amount of lead was removed.

TABLE 4

Results of seven samples from North Island.

| Sample # | North Island Sample #1 | Lead Concentration before | Lead Concentration after |
|---|---|---|---|
| 5 | #1A, 0 minutes, no activated carbon, filtered | 495 ppm | 495 ppm |
| 5 | #1B, 0 minutes, no activated carbon, filtered | 486 ppm | 486 ppm |
| 6 | #1A, 0 minutes, activated carbon, filtered | 495 ppm | 448 ppm |
| 6 | #1B, 0 minutes, activated carbon, filtered | 486 ppm | 440 ppm |
| 1 | #1A, 1 minute, activated carbon, filtered | 495 ppm | 191 ppm |
| 1 | #1B, 1 minute, activated carbon, filtered | 486 ppm | 173 ppm |
| 2 | #1A, 3 minutes, activated carbon, filtered | 495 ppm | 26.4 ppm |
| 2 | #1B, 3 minutes, activated carbon, filtered | 486 ppm | 26.6 ppm |
| 3 | #1A, 5 minutes, activated carbon, filtered | 495 ppm | 12.3 ppm |
| 3 | #1B, 5 minutes, activated carbon, filtered | 486 ppm | 11.9 ppm |
| 7 | #1A, 5 minutes, no activated carbon, filtered | 495 ppm | 18.5 ppm |
| 7 | #1B, 5 minutes, no activated carbon, filtered | 486 ppm | 23.7 ppm |
| 4 | #1A spiked, 5 minutes, activated carbon/filtered | 495 ppm | 380 ppm |
| 4 | #1B spiked, 5 minutes, activated carbon/filtered | 486 ppm | 332 ppm |

The reductions in organolead compounds in these experimental results are on the order from about 495 ppm, by weight, depending on amount of exposure to ozone, to about 12 ppm, by weight, depending on amount of organolead as opposed to inorganic lead present in the sample, by flow rates, particle geometry, temperatures, and pH herein contemplated. The results showed that the present process was able to effectively remove lead from a sample containing a mixture of fuels recovered from an actual contaminated site. The use of activated carbon had a slight effect upon removing some lead from the sample without ozonolysis as well as after ozonolysis. However, a complete profile of the sample is not known and various organic and inorganic forms of lead may have been present and could have been adsorbed on the activated carbon. The results showed very good reproducibility between duplicate samples treated identically.

The methods of the present invention were also developed to treat petroleum contaminated effluent from pump and treat systems. Typically this effluent is around 95–99% water. The above methods for removal of lead works best when the organics are separated and treated, but also works in the presence of water. The lead contaminants must be organic (organoleads, organolead halides, etc.), since it is believed that ozonation will not affect wholly inorganic lead species.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method for removing organolead compounds from aqueous organolead compositions including tetra alkyl lead, comprising:

providing an aqueous compositions including organolead compounds;

ozonating said organolead compositions with ozone, wherein said organolead compounds are oxidized producing insoluble lead oxide polymers;

contacting said aqueous compositions including insoluble lead oxide polymers through activated carbon to remove said insoluble lead oxide polymers;

filtering said aqueous compositions including lead oxide polymers through at least one filtering means having a porosity from about 0.45 $\mu$m to about 50 $\mu$m to remove said insoluble lead oxide polymers; and recovering said aqueous compositions substantially free of organolead.

2. The method according to claim 1, wherein said organolead compounds comprises at least one of tetraethyl lead, tetra methyl lead, ethyltrimethyl lead, diethyldimethyl lead, and any ethyl or methyl lead compounds thereof.

3. The method according to claim 1, wherein said organolead compounds being organohalogenated lead comprising at least one of alkyl lead chlorides including ethyl lead trichloride, diethyl lead chloride, triethyl lead chloride, methyl lead trichloride, dimethyl lead chloride, trimethyl lead chloride, and mixture of transalkylation products thereof.

4. The method according to claim 1, wherein contacting said aqueous composition through activated carbon substantially removes other unwanted contaminants and/or impurities.

5. The method according to claim 1, wherein said filtering means include filters range in porosity from about 1 $\mu$m to about 0.5 $\mu$m.

6. The method according to claim 1, wherein said ozone is produced by chemical or electrical generation.

7. The method according to claim 6, wherein said ozone is produced by an ozone generator.

8. The method according to claim 1, wherein said ozonating said aqueous organolead compositions with ozone for at least about 25 seconds.

9. The method according to claim 1, wherein said organolead compounds are reduced from up to about 99%.

10. The method according to claim 1, wherein said aqueous organolead composition was exposing to at least about 0.001 moles of ozone during said ozonating.

\* \* \* \* \*